United States Patent
Kiyono et al.

(10) Patent No.: US 7,274,539 B2
(45) Date of Patent: Sep. 25, 2007

(54) COMPOSITE TYPE THIN FILM MAGNETIC HEAD HAVING A LOW PARASITIC CAPACITANCE BETWEEN A WRITE COIL AND AN UPPER READ HEAD SHIELD

(75) Inventors: Hiroshi Kiyono, Tokyo (JP); Nozomu Hachisuka, Tokyo (JP); Shunji Saruki, Tokyo (JP); Noriaki Kasahara, Tokyo (JP)

(73) Assignee: TDK Corporation, Tokyo (JP)

( * ) Notice: Subject to any disclaimer, the term of this patent is extended or adjusted under 35 U.S.C. 154(b) by 407 days.

(21) Appl. No.: 11/079,677

(22) Filed: Mar. 15, 2005

(65) Prior Publication Data

US 2005/0219765 A1  Oct. 6, 2005

(30) Foreign Application Priority Data

Apr. 2, 2004 (JP) ............... 2004-109716

(51) Int. Cl.
  *G11B 5/39* (2006.01)
  *G11B 5/11* (2006.01)
  *G11B 5/40* (2006.01)

(52) U.S. Cl. ............ 360/317; 360/126; 360/319; 360/324.2

(58) Field of Classification Search ........ 360/317, 360/324.2, 324.1, 319, 323
See application file for complete search history.

(56) References Cited

U.S. PATENT DOCUMENTS

| | | | | |
|---|---|---|---|---|
| 5,898,548 A | | 4/1999 | Dill et al. | |
| 6,160,688 A | * | 12/2000 | Okumura | 360/323 |
| 6,737,281 B1 | * | 5/2004 | Dang et al. | 438/3 |
| 6,882,508 B2 | * | 4/2005 | Yamaguchi et al. | 360/317 |
| 6,888,702 B2 | * | 5/2005 | Sato et al. | 360/319 |
| 6,952,867 B2 | * | 10/2005 | Sato | 29/603.15 |
| 2002/0154454 A1 | * | 10/2002 | Kupinski et al. | 360/323 |
| 2003/0042571 A1 | * | 3/2003 | Chen et al. | 257/531 |

(Continued)

FOREIGN PATENT DOCUMENTS

CN  1144183 C  3/2004

OTHER PUBLICATIONS

Klass B. Klassen et al., "Write to Read Coupling", IEEE Transactions on Magnetics, vol. 38, No. 1, pp. 61-67 Jan. 2002.
Chinese Office Action, with English-language translation, dated Dec. 22, 2006.

*Primary Examiner*—Jefferson Evans
(74) *Attorney, Agent, or Firm*—Frommer Lawrence & Haug LLP

(57) ABSTRACT

A composite type thin-film magnetic head is provided, which comprises: a MR read head element having an upper shield layer, a lower shield layer, an MR layer in which a sense current flows in a direction perpendicular to a surface of the layer through the upper shield layer and the lower shield layer; an inductive write head element formed on the MR read head element, having an upper magnetic pole layer, a recording gap layer, a lower magnetic pole layer where end portion is opposed to an end portion of the upper magnetic pole layer through the recording gap layer, and a write coil; and a capacitance $C_{12}$ between the write coil and the upper shield layer, set to 0.1 pF or less.

18 Claims, 8 Drawing Sheets

U.S. PATENT DOCUMENTS

2003/0165034 A1* 9/2003 Nikitin et al. .............. 360/322
2005/0219751 A1* 10/2005 Kiyono et al. .............. 360/126
2006/0082929 A1* 4/2006 Kiyono et al. .............. 360/317
2006/0176618 A1* 8/2006 Kagami et al. ............. 360/319
2006/0256481 A1* 11/2006 Kagami et al. ............. 360/317

* cited by examiner

COMPOSITE TYPE THIN FILM MAGNETIC HEAD HAVING A LOW PARASITIC CAPACITANCE BETWEEN A WRITE COIL AND AN UPPER READ HEAD SHIELD

PRIORITY CLAIM

This application claims priority from Japanese patent application No. 2004-109716, filed on Apr. 2, 2004, which is incorporated herein by reference.

BACKGROUND OF THE INVENTION

1. Field of the Invention

The present invention relates to a composite type thin-film magnetic head comprising an inductive write head element and a magnetoresistive (MR) read head element that has a current-perpendicular-to-plane (CPP) structure where a sense current flows in a direction perpendicular to surfaces of layers.

2. Description of the Related Art

Recently, in order to satisfy the demand for larger capacity and more downsizing of a hard disk drive apparatus (HDD), higher recording density in a magnetic disk and more miniaturization of a head gimbal assembly (HGA) including a magnetic head are intended to be achieved.

The more miniaturization of the HGA, however, causes a problem of crosstalk between a writing side and a reading side. Especially, more miniaturization of a magnetic head element causes an increase in density of a current flowing through the element due to a decrease in a cross section area of the element, as well as a decrease in heat dispersion. Moreover, higher frequency for writing results in a steep change in voltage applied to the write head element. Consequently, a crosstalk occurs from the writing side to the reading side, which brings a tendency toward degradation of the characteristics in the read head element. Especially in a tunnel magnetoresistive (TMR) read head element, the crosstalk voltage causes pinholes to be formed in a barrier layer, which result in dielectric breakdown and bring a great degradation of the reading characteristics due to a decrease in an electrical resistance of the element.

A technique to reduce a crosstalk between trace conductors in the writing side and in the reading side is proposed in Klaas B. Klaassen et al., "Write-to-Read Coupling", IEEE Trans. Magn. Vol. 38, pp61-67, January 2002, which analyzes a coupling mechanism between the trace conductors formed on a suspension. In the description, it is concluded that almost all crosstalk is caused by the coupling between the trace conductors, not by the inner coupling in the magnetic head.

However, the inventors achieve the present invention in consequence of analyses and investigations based on the thought that the inner coupling must have a great influence on the crosstalk between the writing and reading sides, as well as the coupling between the trace conductors.

BRIEF SUMMARY OF THE INVENTION

It is therefore an object of the present invention to provide a composite type thin-film magnetic head comprising an MR read head with a CPP structure that can greatly reduce the crosstalk between the writing and reading sides.

According to the present invention, a composite type thin-film magnetic head is provided, which comprises: a MR read head element having an upper shield layer, a lower shield layer, and an MR layer in which a sense current flows in a direction perpendicular to a surface of the MR layer through the upper shield layer and the lower shield layer; and an inductive write head element formed on the MR read head element, having an upper magnetic pole layer, a recording gap layer, a lower magnetic pole layer whose end portion is opposed to an end portion of the upper magnetic pole layer through the recording gap layer, and a write coil, a capacitance $C_{12}$ between the write coil and the upper shield layer, set to 0.1 pF or less.

In an MR read head element with a CPP structure, the upper shield layer and the lower shield layer are used as electrodes of the MR read head element. Therefore, a parasitic capacitance $C_{12}$ generated between the write coil of the inductive write head element and the upper shield layer becomes larger inevitably than a parasitic capacitance $C_{13}$ generated between the write coil and the lower shield layer. Consequently, the conventional art cannot avoid generating a crosstalk voltage between both ends of the MR read head element. However, by setting the parasitic capacitance $C_{12}$ to 0.1 pF or less, a difference between the parasitic capacitances $C_{12}$ and $C_{13}$ becomes smaller, and the generated crosstalk voltage can be reduced.

In a TMR read head element, the above-mentioned reduction of the crosstalk voltage directly applied from the write head element to the read head element can prevent the reading performance from being degraded due to the decrease in the electrical resistance of the element caused by the formation of the pinholes in the barrier layer. Further, in a giant magnetoresistive (GMR) read head element with a CPP structure, the reduction can prevent a decrease in operating life of the read head element due to an enhancement of electromigration, and can also prevent a degradation of magnetic properties due to an enhancement of an interlayer diffusion of metal atoms.

It is preferred that a distance and an opposed area between the write coil and the lower magnetic pole layer, and a distance and an opposed area between the lower magnetic pole layer and the upper shield layer are set so that the capacitance $C_{12}$ becomes 0.1 pF or less.

It is also preferred that an insulating layer with a low dielectric constant is formed between the write coil and the lower magnetic pole layer and between the lower magnetic pole layer and the upper shield layer respectively so that the capacitance $C_{12}$ becomes 0.1 pF or less. The insulating layer with a low dielectric constant may be a layer formed of a silicon dioxide ($SiO_2$).

Also, according to the present invention, a composite type thin-film magnetic head is provided, which comprises: a MR read head element having an upper shield layer, a lower shield layer, and an MR layer in which a sense current flows in a direction perpendicular to a surface of the MR layer through the upper shield layer and the lower shield layer; and an inductive write head element formed on the MR read head element, having an upper magnetic pole layer, a recording gap layer, a lower magnetic pole layer whose end portion is opposed to an end portion of said upper magnetic pole layer through the recording gap layer, and a write coil, a compensating capacitor means formed so that a capacitance $C_{12}$ between the write coil and the upper shield layer and a capacitance $C_{13}$ between the write coil and the lower shield layer are equal to each other.

As mentioned above, in the MR read head element with a CPP structure, the parasitic capacitance $C_{12}$ becomes larger inevitably than the parasitic capacitance $C_{13}$. However, by forming the compensating capacitor means so that the parasitic capacitance $C_{12}$ and the parasitic capacitance $C_{13}$ are equal to each other, the crosstalk voltage can be reduced or prevented.

In a TMR read head element, the above-mentioned reduction of the crosstalk voltage directly applied from the write head element to the read head element can prevent the reading performance from being degraded due to the decrease in the electrical resistance of the element caused by the formation of the pinholes in the barrier layer. Further, in a GMR read head element with a CPP structure, the reduction can prevent a decrease in operating life of the read head element due to an enhancement of electromigration, and can also prevent a degradation of magnetic properties due to an enhancement of an interlayer diffusion of metal atoms.

It is preferred that the compensating capacitor means is formed between the lower magnetic pole layer and the lower shield layer so that the capacitance $C_{12}$ and the capacitance $C_{13}$ are equal to each other. Also preferably, the compensating capacitor means is a pair of conductor layers opposed to each other through an insulating layer, electrically connected to the lower magnetic pole layer and the lower shield layer respectively.

It is also preferred that a capacitance $C_{COMP}$ of the compensating capacitor means equals a capacitance $C_2$ between the lower magnetic pole layer and the upper shield layer.

Further, according to the present invention, a composite type thin-film magnetic head is provided, which comprises: a MR read head element having an upper shield layer, a lower shield layer, and an MR layer in which a sense current flows in a direction perpendicular to a surface of the MR layer through the upper shield layer and the lower shield layer; and an inductive write head element formed on said MR read head element, having an upper magnetic pole layer, a recording gap layer, a lower magnetic pole layer whose end portion is opposed to an end portion of the upper magnetic pole layer through the recording gap layer, and a write coil, a first and a second compensating capacitor means formed respectively between respective ends of the write coil and the lower shield layer.

As mentioned above, in the MR read head element with a CPP structure, the parasitic capacitance $C_{12}$ becomes larger inevitably than the parasitic capacitance $C_{13}$. However, a substantial increase in the parasitic capacitance $C_{13}$ by forming the first and the second compensating capacitor means can make the parasitic capacitance $C_{12}$ and the parasitic capacitance $C_{13}$ equal to each other. Therefore, the crosstalk voltage can be reduced or prevented.

In a TMR read head element, the above-mentioned reduction of the crosstalk voltage directly applied from the write head element to the read head element can prevent the reading performance from being degraded due to the decrease in the electrical resistance of the element caused by the formation of the pinholes in the barrier layer. Further, in a GMR read head element with a CPP structure, the reduction can prevent a decrease in operating life of the read head element due to an enhancement of electromigration, and can also prevent a degradation of magnetic properties due to an enhancement of an interlayer diffusion of metal atoms.

It is preferred that each of a capacitance $C_{COMP1}$ of the first compensating capacitor means and a capacitance $C_{COMP2}$ of the second compensating capacitor means has a value ranging from $1/(2*(1/C_1+1/C_2))$ to $1/(1/C_1+1/C_2)$ where $C_1$ is a capacitance between the write coil and the lower magnetic pole layer, and $C_2$ is a capacitance between the lower magnetic pole layer and the upper shield layer.

It is also preferred that the capacitance $C_{COMP1}$ of the first compensating capacitor and the capacitance $C_{COMP2}$ of the second compensating capacitor are equal to each other.

Further preferably, a pair of lead conductors for the write head element, electrically connected to both ends of the write coil respectively, is further comprised, and the first and the second compensating capacitor means are formed respectively of portions where each of the pair of lead conductors for the write head element and the lower shield layer are overlapped with each other through only an insulating layer.

It is also preferred that the MR read head element is a GMR read head element, or a TMR read head element.

Further objects and advantages of the present invention will be apparent from the following description of preferred embodiments of the invention as illustrated in the accompanying drawings.

DETAILED DESCRIPTION OF THE INVENTION

Figure 1:
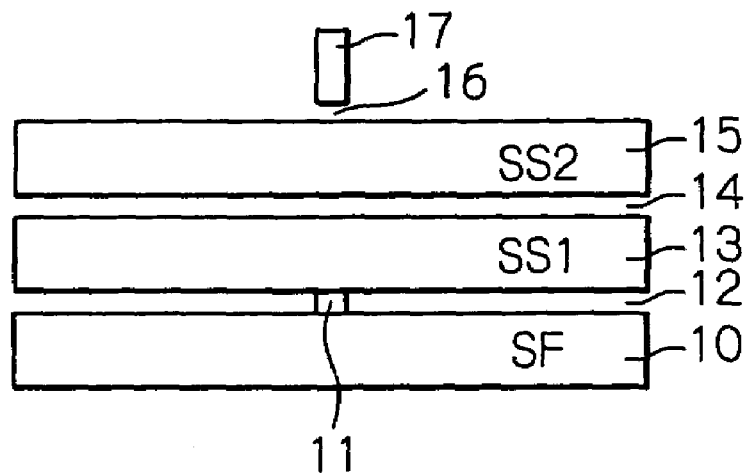
FIG. 1 shows a cross-sectional view from an air bearing surface (ABS) side, schematically illustrating a layered structure of a head element part of a composite type thin-film magnetic head as an embodiment according to the present invention.

FIG. 1 shows a cross-sectional view from the ABS side, schematically illustrating a layered structure of a composite type thin-film magnetic head as an embodiment according to the present invention.

As shown in figure, a head element part has a layered structure including a lower shield layer (SF) 10 stacked on a substrate that is not shown in the figure through an insulating layer that is also not shown, and performing also as a lower electrode layer of a TMR read head element, a TMR multilayered film 11 stacked on the lower shield layer 10, an insulating layer 12 surrounding the TMR multilayered film 11, an upper shield layer (SS1) 13 stacked on the TMR multilayered film 11 and the insulating layer 12, and performing also as an upper electrode layer, a lower magnetic pole layer (SS2) 15 of an inductive write head element stacked on the upper shield layer 13 through an insulating layer 14, and an upper magnetic pole layer 17 opposed to the lower magnetic pole layer 15 through a recording gap layer 16.

The TMR multilayered film 11 has a multilayered structure where, for example, an underlayer, a pinning layer, a pinned layer, a tunnel barrier layer, a free layer and a gap layer that are not shown in the figure are stacked sequentially.

Figure 2:
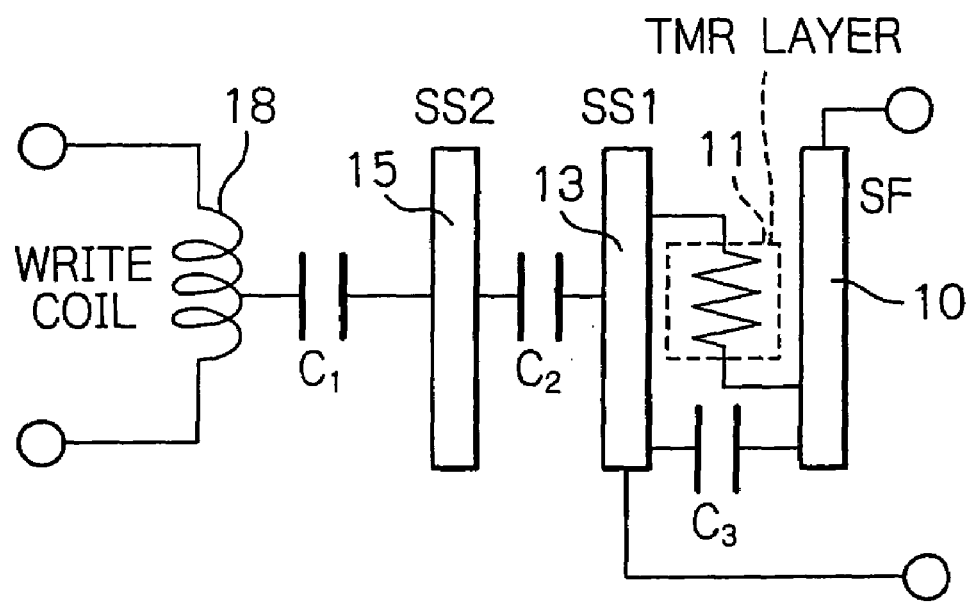
FIG. 2 shows a schematic equivalent circuit of the composite type thin-film magnetic head shown in FIG. 1.

FIG. 2 shows a schematic equivalent circuit of the composite type thin-film magnetic head shown in FIG. 1.

In the figure, reference symbol $C_1$ indicates a parasitic capacitance generated between a write coil 18 and the lower magnetic pole layer (SS2) 15 of the inductive write head element, $C_2$ indicates a parasitic capacitance generated between the lower magnetic pole layer 15 and the upper shield layer (SS1) 13, and $C_3$ indicates a parasitic capacitance generated between the upper shield layer 13 and the lower shield layer 10 respectively.

In the present embodiment, firstly, an enlargement of a distance between the write coil 18 and the lower magnetic pole layer 15, a reduction of an opposed area between them, and/or a formation of an insulating layer interpositioned between them with a low-dielectric-constant insulator such as $SiO_2$, effect a decrease in the parasitic capacitance $C_1$ between the write coil 18 and the lower magnetic pole layer 15. Then, an enlargement of a distance between the lower magnetic pole layer 15 and the upper shield layer 13, a reduction of an opposed area between them, and/or a formation of an insulating layer interpositioned between them with a low-dielectric-constant insulator such as $SiO_2$, effect a decrease in the parasitic capacitance $C_2$ between the lower magnetic pole layer 15 and the upper shield layer 13. By these effects, a parasitic capacitance $C_{12}$ between the write coil 18 and the upper shield layer 13 is set to 0.1 pF or less. In the case, the parasitic capacitance $C_{12}$ is given as $C_{12}=1/(1/C_1+1/C_2)$.

Figure 3A:
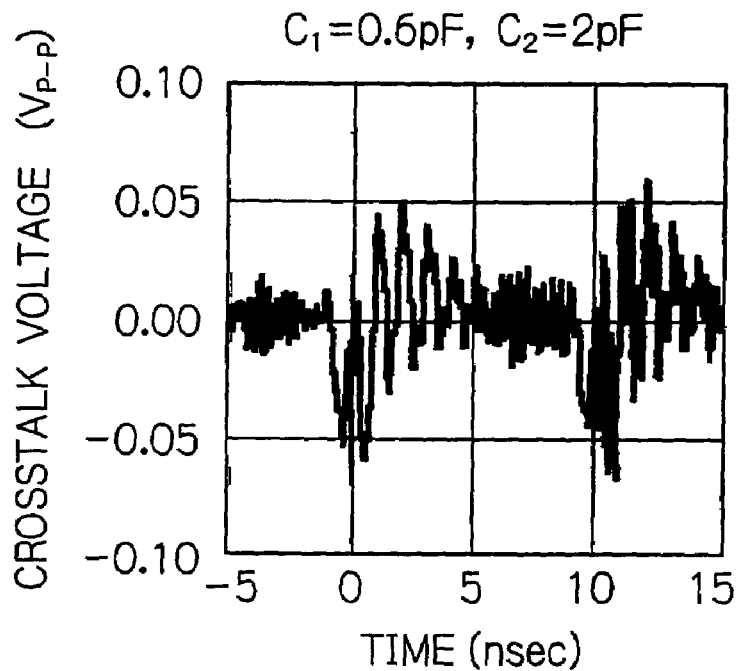
FIGS. 3a and 3b show characteristic graphs illustrating the relations between time and the crosstalk voltage in the composite type thin-film magnetic heads according to the conventional art and the embodiment shown in FIG. 1.
Figure 3B:
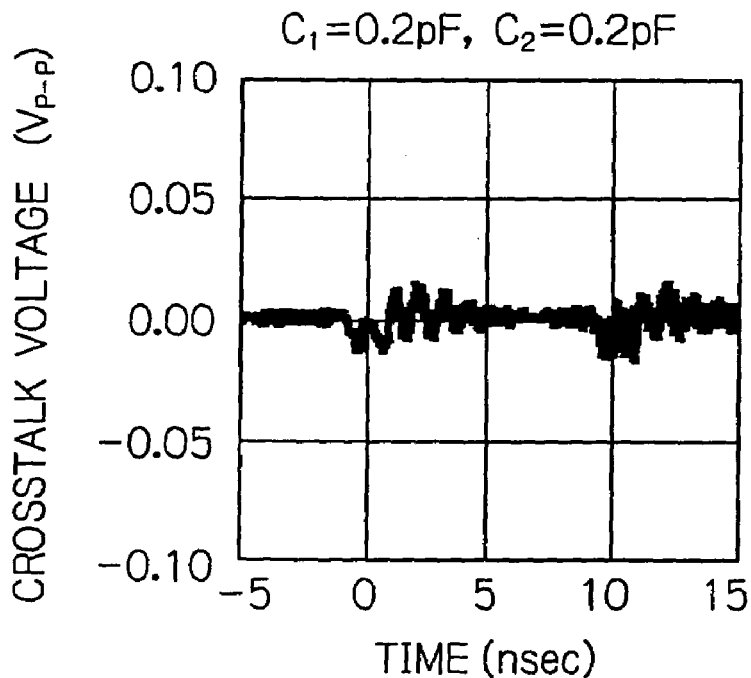

FIGS. 3a and 3b show characteristic graphs illustrating the relations between time and the crosstalk voltage in the composite type thin-film magnetic heads according to the conventional art and the present embodiment.

FIG. 3a shows a crosstalk voltage generated in the read head element by applying a write voltage to the write head element in the case where $C_1$=0.6 pF and $C_2$=2 pF ($C_{12}$=0.46 pF), and FIG. 3b shows a crosstalk voltage in the case where $C_1$=0.2 pF and $C_2$=0.2 pF ($C_{12}$=0.1 pF). In these case, $C_3$=0.4 pF. Apparently from comparison with these figures, the setting of the distance between the layers, the opposed area between them, and/or the insulating material so as to make $C_{12}$ 0.1 pF or less, allows the crosstalk voltage to be reduced greatly. Consequently, the reading performance can surely be prevented from being degraded due to the decrease in the electrical resistance of the element caused by the formation of the pinholes in the barrier layer.

Figure 4:
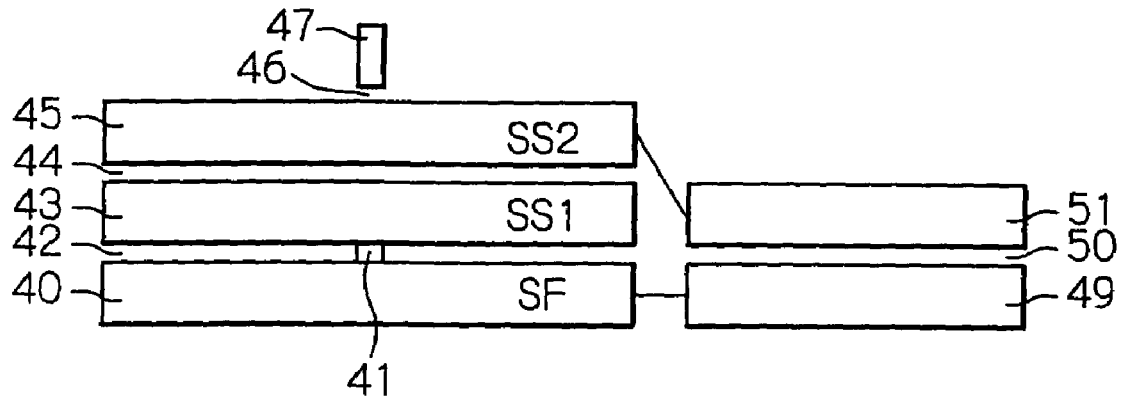
FIG. 4 shows a cross-sectional view from the ABS side, schematically illustrating a layered structure of a head element part of a composite type thin-film magnetic head as another embodiment according to the present invention.

FIG. 4 shows a cross-sectional view from the ABS side, schematically illustrating a layered structure of a composite type thin-film magnetic head as another embodiment according to the present invention.

As shown in the figure, a head element part has a layered structure including a lower shield layer (SF) 40 stacked on a substrate that is not shown in the figure through an insulating layer that is also not shown, and performing also as a lower electrode layer of a TMR read head element, a TMR multilayered film 41 stacked on the lower shield layer 40, an insulating layer 42 surrounding the TMR multilayered film 41, an upper shield layer (SS1) 43 stacked on the TMR multilayered film 41 and the insulating layer 42, and performing also as an upper electrode layer, a lower magnetic pole layer (SS2) 45 of an inductive write head element stacked on the upper shield layer 43 through an insulating layer 44, and an upper magnetic pole layer 47 opposed to the lower magnetic pole layer 45 through a recording gap layer 46. Further, in the present embodiment, an insulating layer 49 is formed so as to be opposed to a conductor layer 51 through a insulating layer 50, and the conductor layer 49 and 51 are connected electrically to the lower shield layer 40 and lower magnetic pole layer 45 respectively. A pair of the conductor layers 49 and 51 and the insulating layer 50 constitute a compensating capacitor adding a parasitic capacitance $C_{COMP}$ to the capacitance between the lower shield layer 40 and the lower magnetic pole layer 45.

The TMR multilayered film 41 has a multilayered structure where, for example, an underlayer, a pinning layer, a pinned layer, a tunnel barrier layer, a free layer and a gap layer that are not shown in the figure are stacked sequentially.

Figure 5:
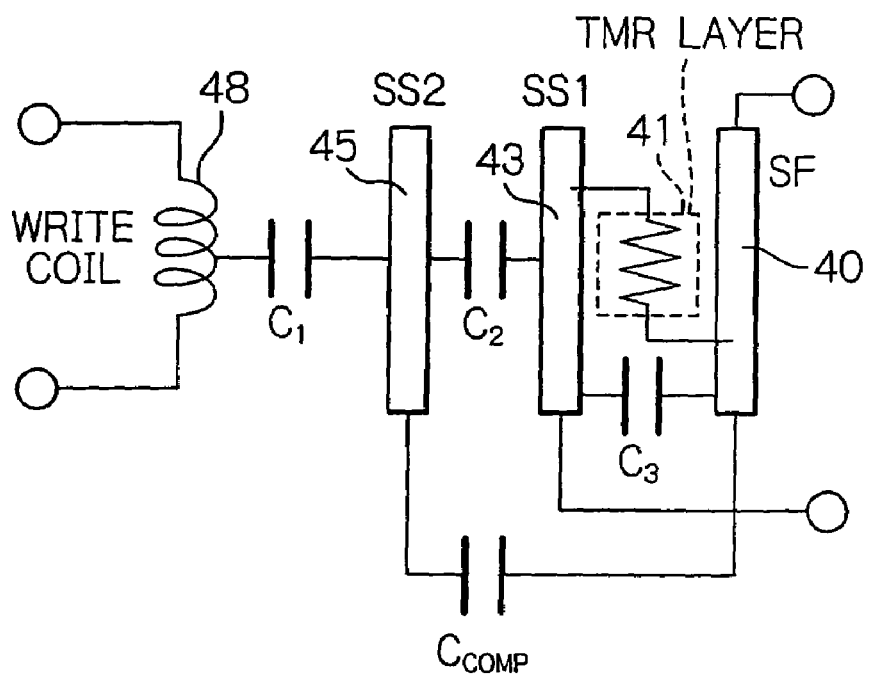
FIG. 5 shows a schematic equivalent circuit of the composite type thin-film magnetic head shown in FIG. 4.

FIG. 5 shows a schematic equivalent circuit of the composite type thin-film magnetic head shown in FIG. 4.

In the figure, reference symbol $C_1$ indicates a parasitic capacitance generated between a write coil 48 and the lower magnetic pole layer (SS2) 45 of the inductive write head element, $C_2$ indicates a parasitic capacitance generated between the lower magnetic pole layer 45 and the upper shield layer (SS1) 43, $C_3$ indicates a parasitic capacitance generated between the upper shield layer 43 and the lower shield layer 40, and $C_{COMP}$ indicates a parasitic capacitance of the above-mentioned compensating capacitor respectively.

In the present embodiment, the capacitance $C_{COMP}$ of the compensating capacitor is set to $C_2$ by adjusting a distance between the conductor layer 49 and 51, an opposed area between them, and/or a dielectric constant of the insulating layer 50. By setting the parasitic capacitance $C_{COMP}$ to such value, which is added to the capacitance between the lower shield layer 40 and lower magnetic pole layer 45, the parasitic capacitances $C_{12}$ and $C_{13}$ can be made equal to each other. Consequently, the crosstalk voltage can be reduced or prevented.

Figure 6A:
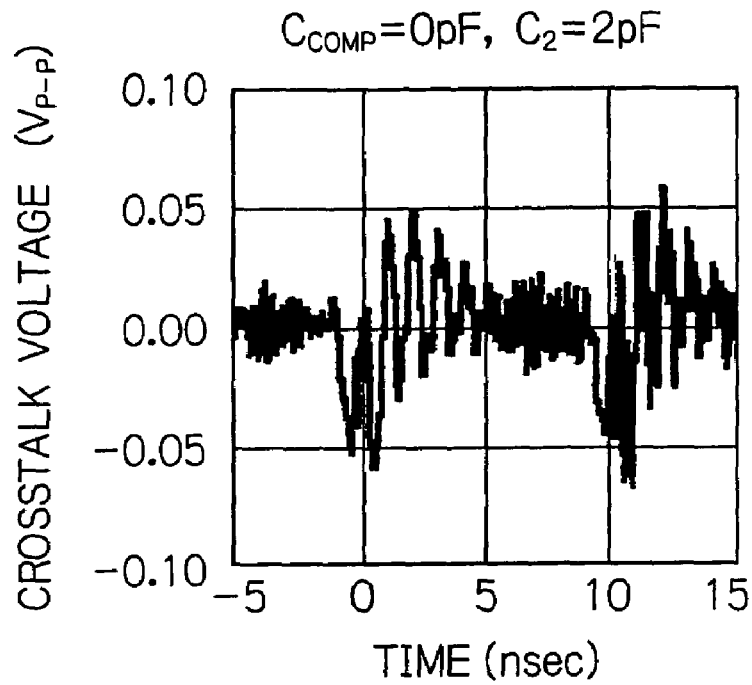
FIGS. 6a and 6b show characteristic graphs illustrating the relations between time and the crosstalk voltage in the composite type thin-film magnetic heads according to the conventional art and the embodiment shown in FIG. 4.
Figure 6B:
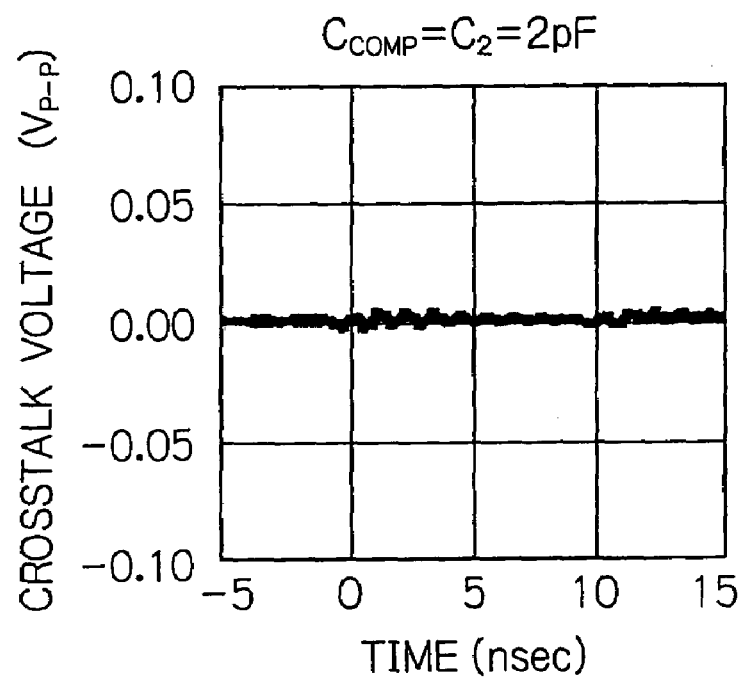

FIGS. 6a and 6b show characteristic graphs illustrating the relations between time and the crosstalk voltage in the composite type thin-film-magnetic heads according to the conventional art and the present embodiment.

FIG. 6a shows a crosstalk voltage generated in the read head element by applying a write voltage to the write head element in the case where $C_{COMP}=0$ pF and $C_2=2$ pF and ($C_{12}=0.48$ pF, $C_{13}=0.316$ pF), and FIG. 6b shows a crosstalk voltage in the case where $C_{COMP}=C_2=2$ pF ($C_{12}=C_{13}=0.46$ pF). In these case, $C_1=0.6$ pF and $C_3=0.4$ pF. Apparently from comparison with these figures, by adding the compensating capacitor where the distance between the layers, the opposed area, and/or the insulating material are adjusted so that $C_{12}=C_{13}$, that is, $C_{COMP}=C_2$, the crosstalk voltage can be reduced greatly or prevented. Consequently, the reading performance can surely be prevented from being degraded due to the decrease in the electrical resistance of the element caused by the formation of the pinholes in the barrier layer.

Figure 7:
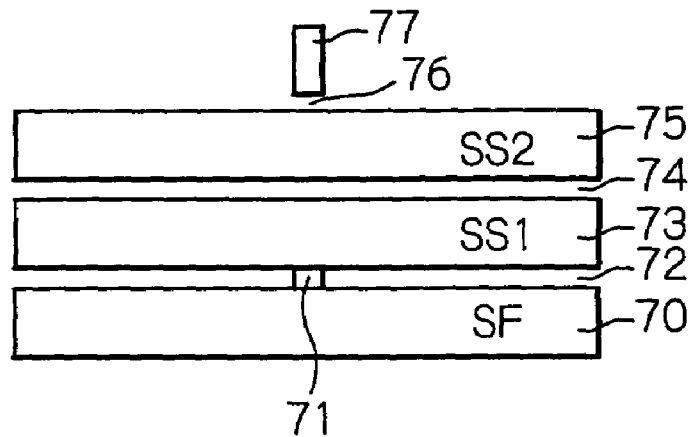
FIG. 7 shows a cross-sectional view from the ABS side, schematically illustrating a layered structure of a head element part of a composite type thin-film magnetic head as further another embodiment according to the present invention.
Figure 8:
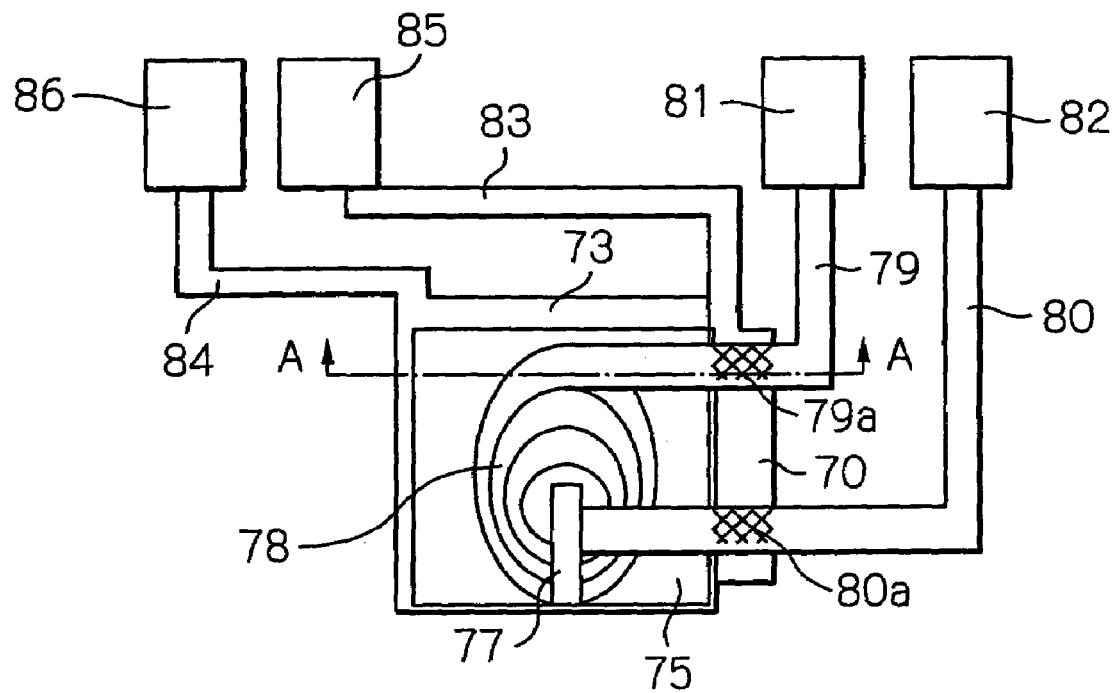
FIG. 8 shows an elevation view from the element-formed surface side, illustrating a magnetic head slider mounting the composite type thin-film magnetic head shown in FIG. 7.
Figure 9:
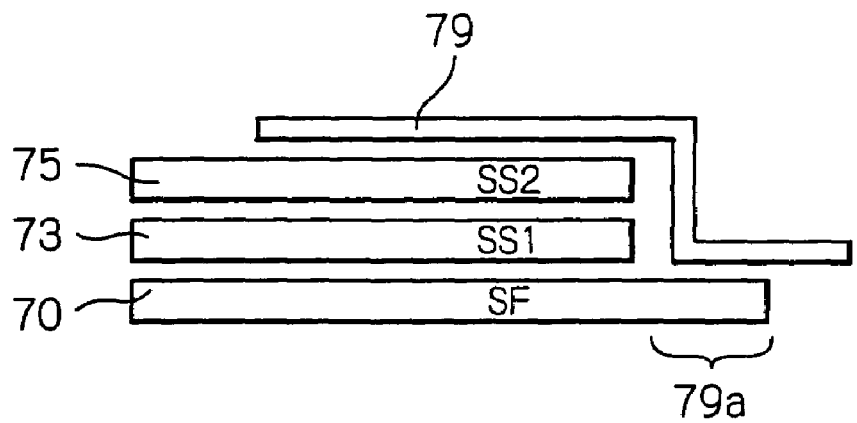
FIG. 9 shows a cross-sectional view from the ABS side taken along line A-A shown in FIG. 8, schematically illustrating a layered structure of a lead conductor part of the composite type thin-film magnetic head shown in FIG. 7.

FIG. 7 shows a cross-sectional view from the ABS side, schematically illustrating a layered structure of a composite type thin-film magnetic head as further another embodiment according to the present invention, and FIG. 8 shows a elevation view from the element-formed surface side illustrating a magnetic head slider mounting the composite type thin-film magnetic head, and FIG. 9 shows a cross-sectional view taken along line A-A from the ABS side, schematically illustrating a layered structure of a lead conductor part of the composite type thin-film magnetic head.

As shown in FIG. 7, a head element part has a layered structure including a lower shield layer (SF) 70 stacked on a substrate that is not shown in the figure through an insulating layer that is also not shown, and performing also as a lower electrode layer of a TMR read head element, a TMR multilayered film 71 stacked on the lower shield layer 70, an insulating layer 72 surrounding the TMR multilayered film 71, an upper shield layer (SS1) 73 stacked on the TMR multilayered film 71 and the insulating layer 72, and performing also as an upper electrode layer, a lower magnetic pole layer (SS2) 75 of an inductive write head element stacked on the upper shield layer 73 through an insulating layer 74, and an upper magnetic pole layer 77 opposed to the lower magnetic pole layer 75 through a recording gap layer 76, as well as the structure in FIG. 1.

The TMR multilayered film 71 has a multilayered structure where, for example, an underlayer, a pinning layer, a pinned layer, a tunnel barrier layer, a free layer and a gap layer that are not shown in the figure are stacked sequentially.

In FIG. 8, reference numeral 78 indicates a write coil, 79 and 80 indicate a pair of lead conductors for the write head element, one ends of which are electrically connected to both ends of the write coil 78 respectively, 81 and 82 indicate a pair of terminal pads for the write head element, which are electrically connected to other ends of the pair of lead conductors 79 and 80 for the write head element respectively, 83 and 84 indicate a pair of lead conductors for the read head element, one ends of which are electrically connected to both ends of the TMR layer 71 respectively, and 85 and 86 indicate a pair of terminal pads for the read head element, which are electrically connected to other ends of the pair of lead conductors 83 and 84 for the read head element respectively.

As shown in FIG. 9, a portion 79a of the lead conductor 79 for the write head element is overlapped with the lower shield layer (SF) 70 through only the insulating layer 72, that is, opposed directly to the lower shield layer 70. Further, a portion 80a of the lead conductor 80 for the write head element is also overlapped with the lower shield layer (SF) 70 through only the insulating layer 72, that is, opposed directly to the lower shield layer 70.

These overlapped portions act additionally as a first and a second compensating capacitors adding the parasitic capacitances $C_{COMP1}$ and $C_{COMP2}$ respectively to the capacitances between the lower shield layer 70 and respective ends of the write coil 78 (the lead conductors 79 and 80 for the write head element).

Figure 10:
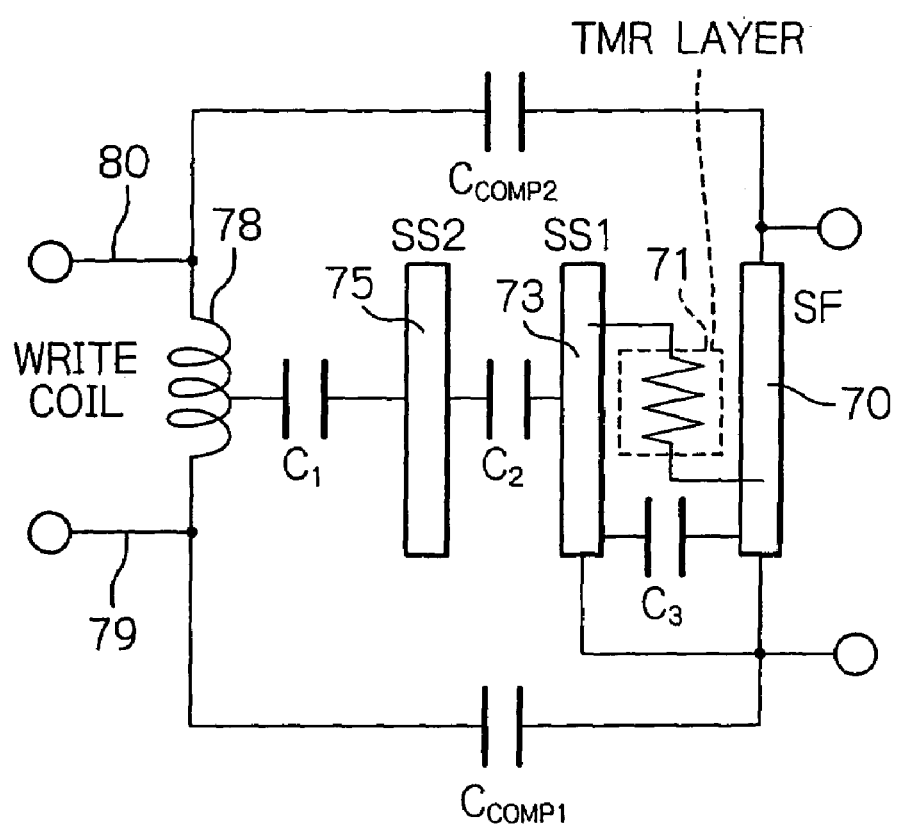
FIG. 10 shows a schematic equivalent circuit of the composite type thin-film magnetic head shown in FIG. 7.

FIG. 10 shows a schematic equivalent circuit of the composite type thin-film magnetic head shown in FIG. 7.

In the figure, reference symbol $C_1$ indicates a parasitic capacitance generated between the write coil 78 and the lower magnetic pole layer (SS2) 75 of the inductive write head element, $C_2$ indicates a parasitic capacitance generated between the lower magnetic pole layer 75 and the upper shield layer (SS1) 73, $C_3$ indicates a parasitic capacitance generated between the upper shield layer 73 and the lower shield layer 70, and $C_{COMP1}$ and $C_{COMP2}$ indicate parasitic capacitances of the above-mentioned first and second compensating capacitors respectively.

In the present embodiment, the first and the second compensating capacitors are formed respectively by making the overlapped portions 79a and 80a between the respective lead conductors 79 and 80 for the write head element and the lower shield layer 70. Further, by adjusting a distance between the lead conductors 79 and 80 and the lower shield layer 70, an opposed area between them, and/or a dielectric constant of the insulating layer between them, the capacitances $C_{COMP1}$ and $C_{COMP2}$ of the first and second compensating capacitors are set to values satisfying the condition where $C_{COMP1}=C_{COMP2}$ and $C_{COMP1}$ ($C_{COMP2}$) takes a value ranging from $1/(2*(1/C_1+1/C_2))$ to $1/(1/C_1+1/C_2)$.

By forming the first and second compensating capacitors and adjusting the capacitances $C_{COMP1}$ and $C_{COMP2}$ of them to such values, the crosstalk voltage can be reduced greatly or prevented.

In addition, evidently, a first and a second compensating capacitors may be formed between the lead conductors 79 and 80 for the write head element and the lead conductor 83 for the read head element electrically connected to the lower shield layer 70, which is substituted for the lower shield layer 70.

Figure 11A:
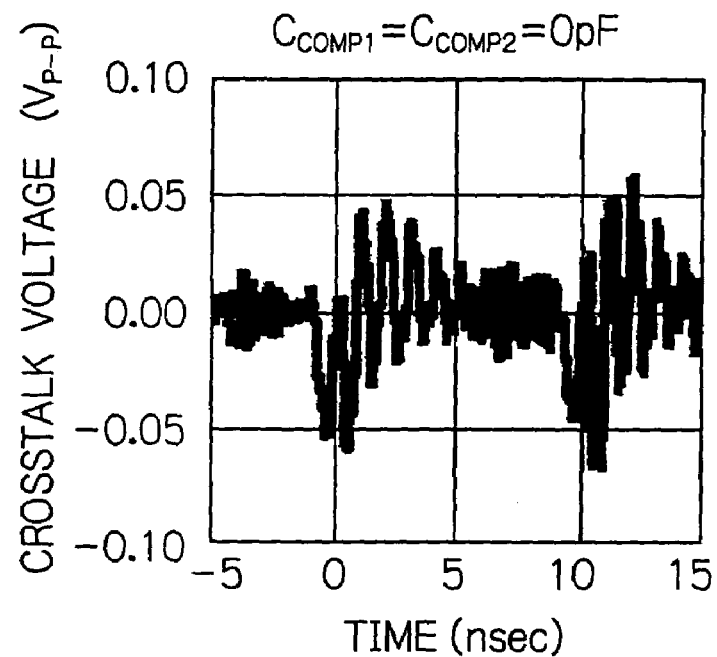
FIGS. 11a and 11b show characteristic graphs illustrating the relations between time and the crosstalk voltage in the composite type thin-film magnetic heads according to the conventional art and the embodiment shown in FIG. 7.
Figure 11B:
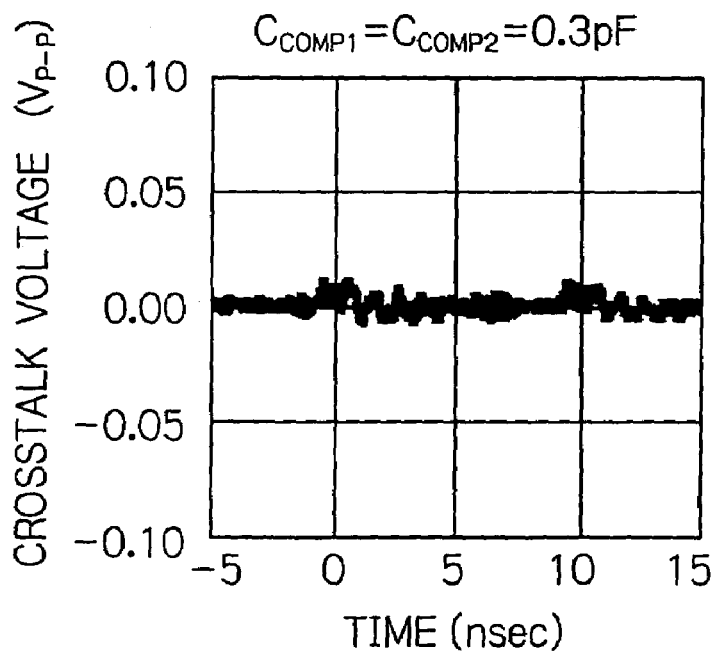
Figure 12:
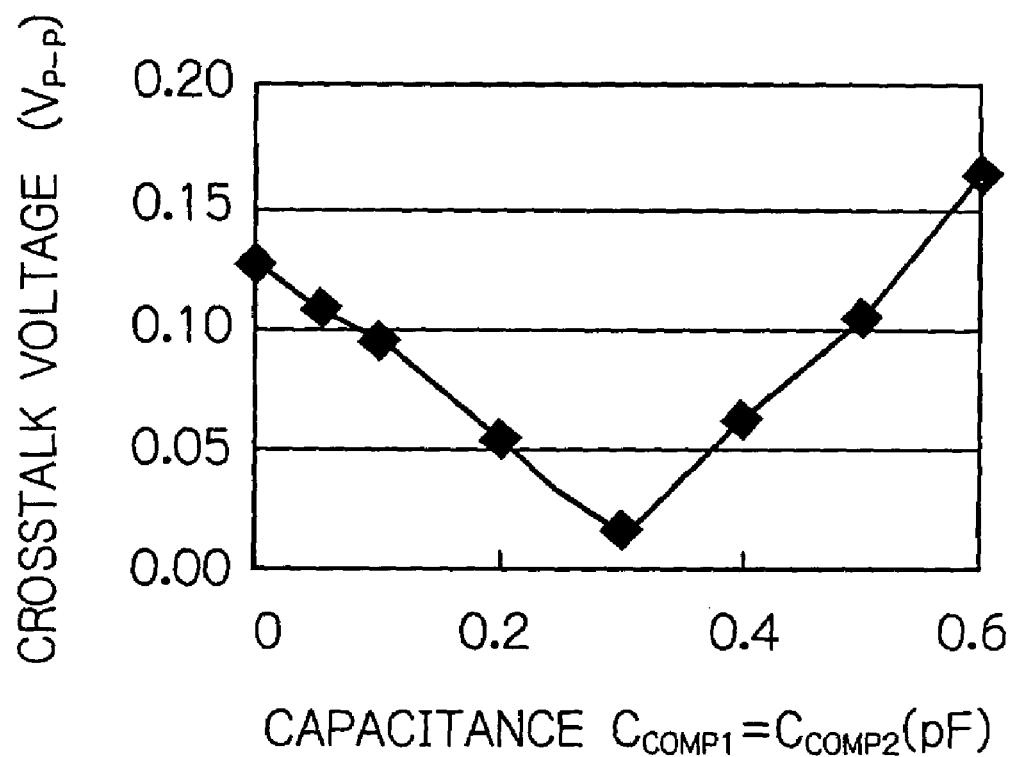
FIG. 12 shows a characteristic graph illustrating the relation between capacitances $C_{COMP1}$ and $C_{COMP2}$ of the compensating capacitors and the crosstalk voltage in the composite type thin-film magnetic heads shown in FIG. 7.

FIGS. 11a and 11b show characteristic graphs illustrating the relations between time and the crosstalk voltage in the composite type thin-film magnetic heads according to the conventional art and the present embodiment, and FIG. 12 shows a characteristic graph illustrating the relation between capacitances $C_{COMP1}$ and $C_{COMP2}$ of the compensating capacitors and the crosstalk voltage.

FIG. 11a shows a crosstalk voltage generated in the read head element by applying a write voltage to the write magnetic head element in the case where $C_{COMP1}=C_{COMP2}=0$ pF, and FIG. 11b shows a crosstalk voltage in the case where $C_{COMP1}=C_{COMP2}=0.3$ pF. In these cases, $C_1=0.6$ pF, $C_2=2$ pF and $C_3=0.4$ pF. Apparently from comparison with these figures, the crosstalk voltage can be reduced greatly by forming the first and second compensating capacitors and setting the capacitances $C_{COMP1}$ and $C_{COMP2}$ of them to values in the above-mentioned range. Especially, as shown in FIG. 12, a setting of $C_{COMP1}$ ($=C_{COMP2}$) to a value near 0.3 pF minimalizes the crosstalk voltage. Consequently, the reading performance can surely be prevented from being degraded due to the decrease in the electrical resistance of the element caused by the formation of the pinholes in the barrier layer.

The present invention has been explained by showing the composite type thin-film magnetic head having the TMR read head element. However, the present invention can be applied to whatever is an MR read head element having a structure where a sense current flows in a direction perpendicular to a surface of the layer, such as a GMR read head element with a CPP structure, for example. In an application of the present invention to the GMR read head element with the CPP structure, a reduction of the crosstalk voltage directly applied from the write head element to the read head element can prevent a decrease in operating life of the read head element due to an enhancement of electromigration and can also prevent a degradation of magnetic properties due to an enhancement of an interlayer diffusion of metal atoms.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A composite type thin-film magnetic head, comprising:
a magnetoresistive read head element having an upper shield layer, a lower shield layer, and an magnetoresistive layer in which a sense current flows in a direction perpendicular to a surface of said magnetoresistive layer through said upper shield layer and said lower shield layer; and
an inductive write head element formed on said magnetoresistive read head element, having an upper magnetic pole layer, a recording gap layer, a lower magnetic pole layer whose end portion is opposed to an end portion of said upper magnetic pole layer through said recording gap layer, and a write coil,
a capacitance $C_{12}$ between said write coil and said upper shield layer, set to 0.1 pF or less.

2. The composite type thin-film magnetic head as claimed in claim 1, wherein a distance and an opposed area between said write coil and said lower magnetic pole layer, and a distance and an opposed area between said lower magnetic pole layer and said upper shield layer are set so that said capacitance $C_{12}$ becomes 0.1 pF or less.

3. The composite type thin-film magnetic head as claimed in claim 1, wherein an insulating layer with a low dielectric constant is formed between said write coil and said lower magnetic pole layer and between said lower magnetic pole layer and said upper shield layer respectively so that said capacitance $C_{12}$ becomes 0.1 pF or less.

4. The composite type thin-film magnetic head as claimed in claim 3, wherein said insulating layer with a low dielectric constant is a layer formed of a silicon dioxide.

5. The composite type thin-film magnetic head as claimed in claim 1, wherein said magnetoresistive read head element is a giant magnetoresistive read head element.

6. The composite type thin-film magnetic head as claimed in claim 1, wherein said magnetoresistive read head element is a tunnel magnetoresistive read head element.

7. A composite type thin-film magnetic head, comprising:
a magnetoresistive read head element having an upper shield layer, a lower shield layer, and an magnetoresistive layer in which a sense current flows in a direction perpendicular to a surface of said magnetoresistive layer through said upper shield layer and said lower shield layer; and
an inductive write head element formed on said magnetoresistive read head element, having an upper magnetic pole layer, a recording gap layer, a lower magnetic pole layer whose end portion is opposed to an end portion of said upper magnetic pole layer through said recording gap layer, and a write coil,
a compensating capacitor means formed so that a capacitance $C_{12}$ between said write coil and said upper shield layer and a capacitance $C_{13}$ between said write coil and said lower shield layer are equal to each other.

8. The composite type thin-film magnetic head as claimed in claim 7, wherein said compensating capacitor means is formed between said lower magnetic pole layer and said lower shield layer so that said capacitance $C_{12}$ and said capacitance $C_{13}$ are equal to each other.

9. The composite type thin-film magnetic head as claimed in claim 8, wherein said compensating capacitor means is a pair of conductor layers opposed to each other through an insulating layer, electrically connected to said lower magnetic pole layer and said lower shield layer respectively.

10. The composite type thin-film magnetic head as claimed in claim 7, wherein a capacitance $C_{COMP}$ of said compensating capacitor means equals a capacitance $C_2$ between said lower magnetic pole layer and said upper shield layer.

11. The composite type thin-film magnetic head as claimed in claim 7, wherein said magnetoresistive read head element is a giant magnetoresistive read head element.

12. The composite type thin-film magnetic head as claimed in claim 7, wherein said magnetoresistive read head element is a tunnel magnetoresistive read head element.

13. A composite type thin-film magnetic head, comprising:
a magnetoresistive read head element having an upper shield layer, a lower shield layer, and an magnetoresistive layer in which a sense current flows in a direction perpendicular to a surface of said magnetoresistive layer through said upper shield layer and said lower shield layer; and
an inductive write head element formed on said magnetoresistive read head element, having an upper magnetic pole layer, a recording gap layer, a lower magnetic pole layer whose end portion is opposed to an end portion of said upper magnetic pole layer through said recording gap layer, and a write coil,
a first and a second compensating capacitor means formed respectively between respective ends of said write coil and said lower shield layer.

14. The composite type thin-film magnetic head as claimed in claim 13, wherein each of a capacitance $C_{COMP1}$ of said first compensating capacitor means and a capacitance $C_{COMP2}$ of said second compensating capacitor means has a value ranging from $1/(2*(1/C_1+1/C_2))$ to $1/(1/C_1+1/C_2)$ where $C_1$ is a capacitance between said write coil and said lower magnetic pole layer, and $C_2$ is a capacitance between said lower magnetic pole layer and said upper shield layer.

15. The composite type thin-film magnetic head as claimed in claim 13, wherein said capacitance $C_{COMP1}$ of said first compensating capacitor and said capacitance $C_{COMP2}$ of said second compensating capacitor are equal to each other.

16. The composite type thin-film magnetic head as claimed in claim 13, wherein a pair of lead conductors for said write head element, electrically connected to both ends of said write coil respectively, is further comprised, and said first and said second compensating capacitor means are formed respectively of portions where each of said pair of lead conductors for said write head element and said lower shield layer are overlapped with each other through only an insulating layer.

17. The composite type thin-film magnetic head as claimed in claim 13, wherein said magnetoresistive read head element is a giant magnetoresistive read head element.

18. The composite type thin-film magnetic head as claimed in claim 13, wherein said magnetoresistive read head element is a tunnel magnetoresistive read head element.

* * * * *